Feb. 3, 1931.  L. W. STATLER ET AL  1,791,008
LUBRICATING PULLEY
Filed Oct. 15, 1929
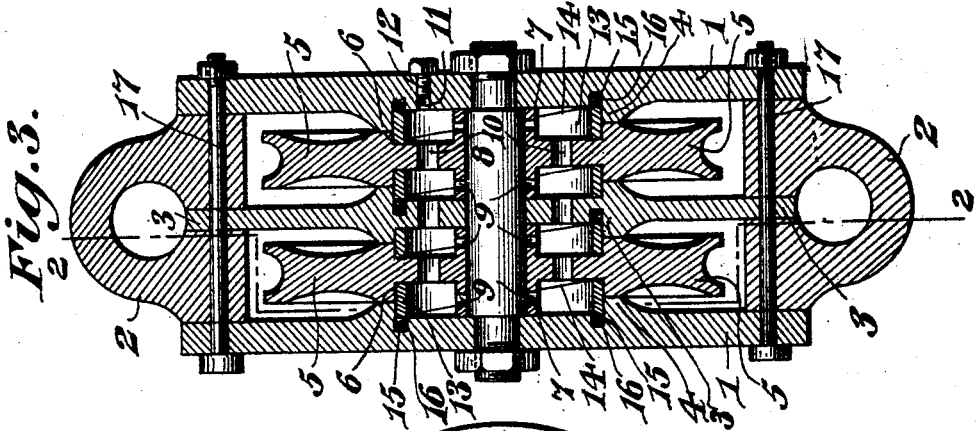
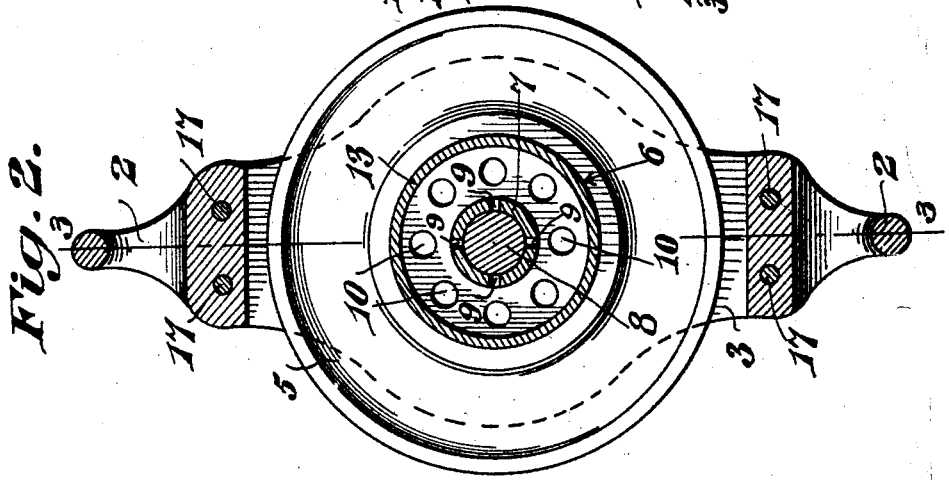
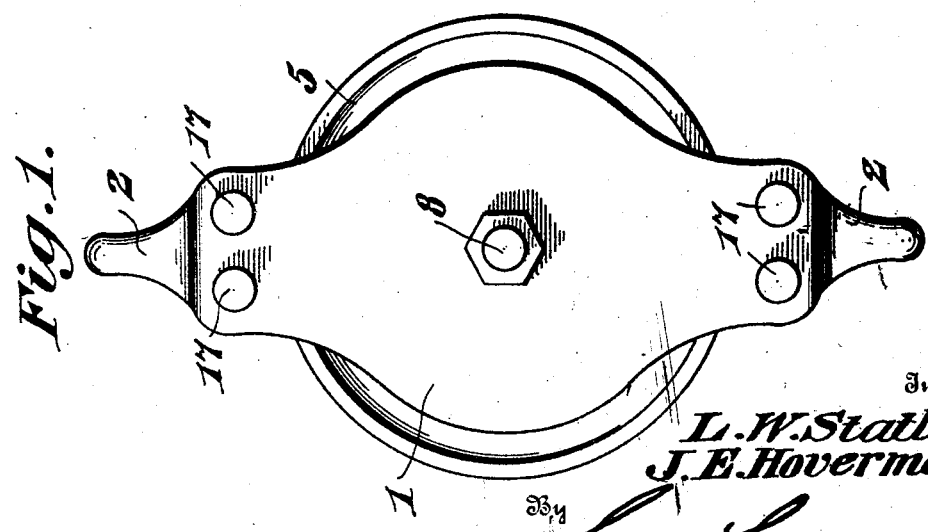
Inventor:
L. W. Statler
J. E. Hovermale,
By
Lacey & Lacey,
Attorney Patented Feb. 3, 1931

1,791,008

UNITED STATES PATENT OFFICE

LLOYD W. STATLER AND JAMES E. HOVERMALE, OF SAN QUENTIN, CALIFORNIA

LUBRICATING PULLEY

Application filed October 15, 1929. Serial No. 399,861.

The present invention relates to pulleys and sheave blocks and has particular reference to the lubrication of the same, the object being to provide a simple and inexpensive construction whereby lubricant may be supplied to and circulate freely through all parts of the pulley hub and the axle or spindle upon which it rotates. A particular object of the invention is to provide means whereby the lubricant will be prevented from leaking from the oil chamber and spreading over the face of the pulley. The invention is illustrated in the accompanying drawing and will be hereinafter fully set forth.

In the drawing:

Figure 1 is a side elevation of a sheave block having the invention embodied therein.

Fig. 2 is a vertical section of the same, and

Fig. 3 is a vertical transverse section on the line 3—3 of Fig. 2, the plane of the section shown in Fig. 2 being indicated by the line 2—2 in Fig. 3.

The sheave block in the illustrated construction comprises cheek plates 1 of suitable form and eyes or suspension blocks 2 disposed between the cheek plates at the ends of the same. Each eye block has a slot formed centrally through its inner end and these slots receive the ends of a partition 3, the said partition having a central opening alining with central circular recesses formed in the inner faces of the cheek plates and the partition and the cheek plates being each enlarged or provided with a circular rib or shoulder 4 around the respective opening and recess. The sheaves or pulleys 5 are disposed between the partition and the respective cheek plates and they are provided in each side at their centers with annular grooves 6 about their hubs 7 which fit closely about an axle or spindle 8 fitted in openings provided therefor in the cheek plates and secured firmly therein. The hubs 7 of the sheaves are provided with radial openings 9 whereby lubricant is permitted to pass through the hub walls to spread over the surface of the axle, as will be understood, and through the bodies of the sheaves within the areas of the grooves 6 are transverse openings 10 which permit a circulation of the lubricant through the several grooves or oil chambers to reach the openings 9 and pass thence to the axle. In one cheek plate is formed an inlet opening 11 through which the oil may be inserted into the oil chambers and this opening is normally closed by a screw plug 12, as shown and as will be understood. To bridge the joint between the sheaves and the partition and between the sheaves and the cheek plates, we provide sealing rings 13 which are preferably of resilient metal and are diagonally split, as indicated at 14, whereby they will tend to expand and fit closely against the shoulders 4 and the outer circumferences of the grooves 6 and thereby effectually prevent leakage of the oil through the joints. The resilient characteristic of these sealing rings and the diagonal split therein provides for annular expansion so that the joint will be effectually bridged. In order to maintain the rings in contact with the sides of the sheaves, sockets 15 are formed at intervals in the sides of the partition and of the cheek plates and coiled expansion springs 16 are mounted in said sockets to bear against the edges of the sealing rings and thereby hold them against the sides of the sheaves, as will be understood upon reference to Fig. 3.

It is thought to be evident from the foregoing description, taken in connection with the accompanying drawing, that we have provided a very simple and inexpensive construction whereby sheaves and pulleys will be very effectually and conveniently lubricated so that they will run easily under all conditions of use. It should be noted that the ends of the central partition 3 are secured in the eye blocks 2 and said blocks are secured between the ends of the cheek plates by a pair of bolts 17 inserted through the respective ends of the structure so that tilting of the cheek plates will be prevented and, consequently, they will be secured against rubbing upon the sides of the sheaves throughout the life of the device so that all unnecessary wear is avoided and the sheaves or pulleys will run true at all times.

Having thus described the invention, we claim:

1. A sheave block comprising a pair of cheek plates, a partition secured between and parallel with the cheek plates, a spindle secured in the cheek plates and extending through the partition, pulleys disposed between the partition and the cheek plates and having hubs fitted rotatably upon the spindle and provided with radial openings, sealing rings disposed between the sheaves and the partition and between the sheaves and the cheek plates, and means whereby lubricant may be supplied to the interior of these rings and circulate through the sheaves and the partition and the hubs to the axle.

2. A sheave block comprising a pair of cheek plates having central circular ribs on their opposed faces, one of the cheek plates being provided with an oil feed opening, a partition disposed midway between the cheek plates and provided on its opposite faces with a central circular rib coaxial with the ribs on the cheek plates, the partition having openings therethrough concentric with said rib, a spindle secured in and extending between the cheek plates and through the partition, sheaves disposed between the partition and the cheek plates and having hubs encircling the spindle, the sheaves being provided with annular grooves on their opposite sides arranged coaxial with the ribs on the partition and the cheek plates, the hubs of the sheaves having openings therethrough to admit lubricant to the spindle and the webs of the sheaves having openings therethrough to permit flow of lubricant, sealing rings disposed against the outer walls of the grooves in the sheaves and against the shoulders of the partition and the cheek plates, and expansion springs seated in the cheek plates and the partition and bearing against the edges of said sealing rings.

In testimony whereof we affix our signatures.

LLOYD W. STATLER. [L. S.]
JAMES E. HOVERMALE. [L. S.]